United States Patent

Elkins et al.

[11] Patent Number: 5,825,802
[45] Date of Patent: Oct. 20, 1998

[54] OPTICAL ELEMENTS FOR LASERS

[76] Inventors: Robin K. Elkins, 4018 N. 30th Ave., Hollywood, Fla. 33020; Martin Bottomley Grier, P.O. Box 195, Alto, N. Mex. 88312

[21] Appl. No.: 110,493

[22] Filed: Aug. 23, 1993

Related U.S. Application Data

[63] Continuation of Ser. No. 796,826, Nov. 25, 1991, abandoned.

[51] Int. Cl.$^6$ .................................................. H01S 3/08
[52] U.S. Cl. ............................................. 372/100; 372/66
[58] Field of Search ............................... 372/66, 94, 100; 359/629, 638, 640, 833, 836, 855, 856; 356/353, 354, 363, 357

[56] References Cited

U.S. PATENT DOCUMENTS

| | | | |
|---|---|---|---|
| 3,631,362 | 12/1971 | Alnasi | 382/35 X |
| 3,699,474 | 10/1972 | Landry | 372/100 X |
| 4,277,139 | 7/1981 | Cox | 359/833 |
| 4,357,704 | 11/1982 | Koechner | 372/72 |
| 4,386,853 | 6/1983 | Ljung | 372/94 |
| 4,448,832 | 5/1984 | Kidwell | 372/107 X |
| 4,504,147 | 3/1985 | Huang | 356/353 X |
| 4,523,809 | 6/1985 | Taboada et al. | 356/354 X |
| 4,616,929 | 10/1986 | Bernelin et al. | 372/94 X |
| 4,717,240 | 1/1988 | Gilby | 356/356 X |
| 4,839,902 | 6/1989 | Guch, Jr. | 372/70 |
| 4,972,429 | 11/1990 | Herbst | 372/100 |
| 5,119,394 | 6/1992 | Scheps | 372/70 X |

*Primary Examiner*—Rodney B. Bovernick
*Assistant Examiner*—Robert E. Wise
*Attorney, Agent, or Firm*—Joseph Zallen, Esq.

[57] ABSTRACT

An optical element providing greater conversion efficiency and comprising a pyramid having a square base and four triangular faces of equal size and shape meeting at the apex. The optical element can also comprise an octahedron or double pyramid of similar configuration.

9 Claims, 7 Drawing Sheets

OPTICAL ELEMENTS FOR LASERS

This is a continuation of patent application Ser. No. 07/796,826, filed Nov. 25, 1991 by the applicants, which application is now abandoned.

BACKGROUND OF THE INVENTION

This invention relates to a novel optical element: In particular, it relates to a novel optical element which can be used in connection with laser equipment.

Optical elements which have been described in the prior art for laser beams include mirrors and prisms such as right angle prisms, dove prisms, penta-prisms, and roof prisms.

One object of the present invention is to provide an optical element capable of sustaining higher power than a mirror.

Another object is to provide an optical element or laser material with more usable orientations.

Yet another object of this invention is to provide an optical element made of laser material which has a greater conversion efficiency by providing greater power per volume.

Other objects and advantages of this invention will be apparent from the description and claims which follow taken together with the appended drawings.

SUMMARY OF INVENTION

Figure 1:
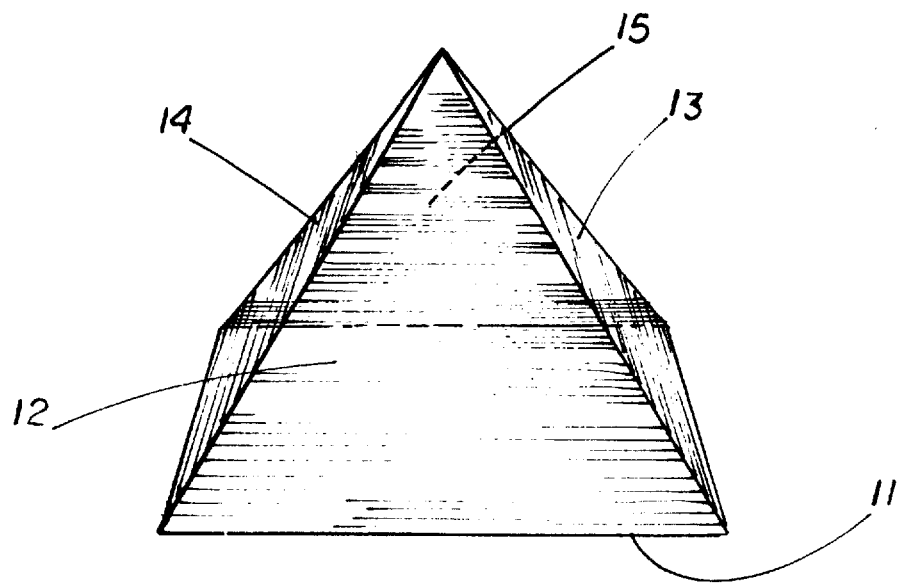
FIG. 1 is a side view of one embodiment of this invention, each face is an equilateral triangle.
Figure 2:
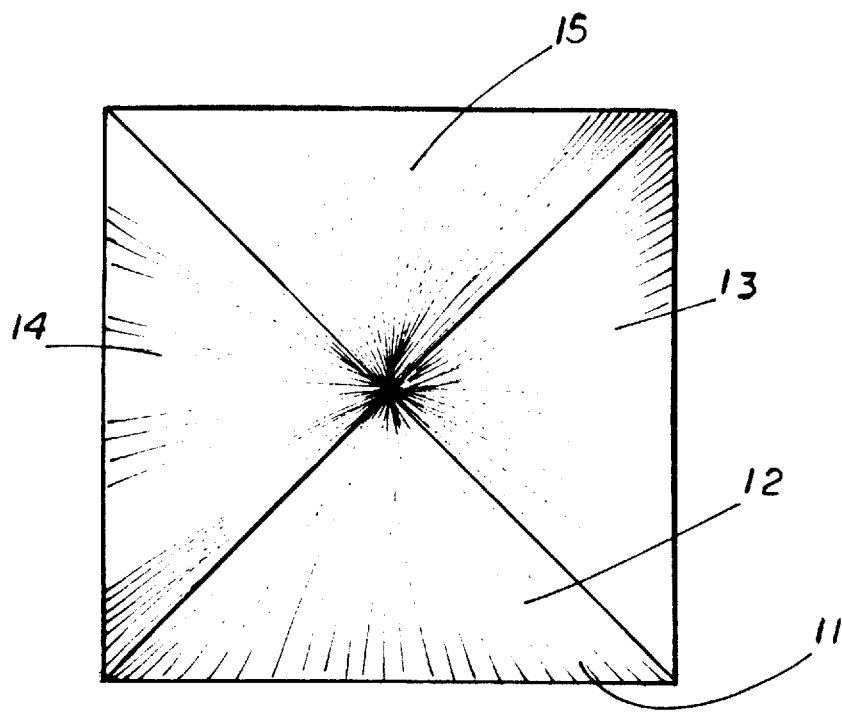
FIG. 2 is a top view of FIG. 1.
Figure 3:
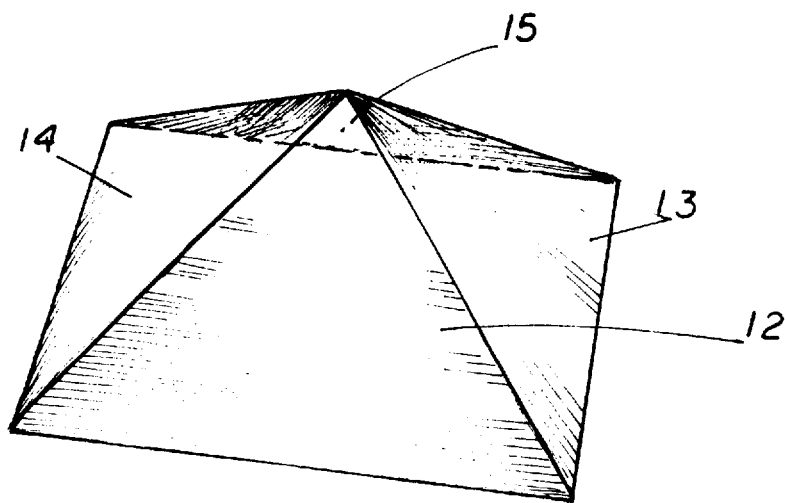
FIG. 3 is a perspective view of the embodiment of FIG. 1.
Figure 4:
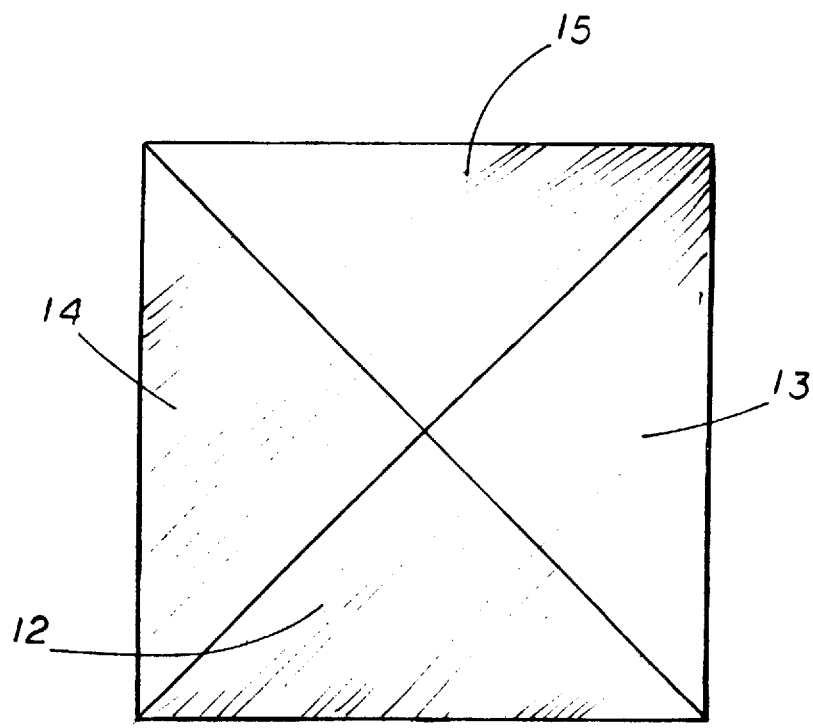
FIG. 4 is a bottom view of the embodiment of FIG. 1.

In one form of the present invention a four-sided glass pyramid optical element is utilized wherein the base is square and the side panels are triangles of equal size and shape meeting at the apex. In one preferred embodiment the side panels are equilateral triangles. In another preferred embodiment the side panels are right triangles with 45° acute angles.

The optical pyramids of this invention can be substituted for other reflectors used in laser equipment. For example, in an interferometer the optical pyramids can be used as beam splitters and reflectors. In a laser resonator wherein a laser pump activates a laser material, the optical pyramids can be substituted for the commonly used mirrors. Thus, a laser cavity having a dye or Nd:YAG as a laser material in the cavity can use the optical pyramids as reflectors and also as beam splitters. The laser can be activated by an optical pump, such as a flash lamp, or by an electrical power source to ionize a gas in the cavity. One advantage of the pyramid used as a reflector is that it has no coating and can thus handle more sustained higher power than a mirror. Mirror coatings are the first to be damaged by high power lasers.

In another application, the pyramids can be used as reflectors and beam splitters in the structure of a laser gyroscope, of the sort used in modern aircraft.

This invention is primarily usable with visible light, ultraviolet light and infrared. The optical element can be made of BK-7 glass, certified fused quartz, sapphire, or similar optical materials. A common coating is an aluminum silicate overlay. An optical element for many uses is made of a high quality optical glass. One glass pyramid that was tested was 90° with a bevel of 0.002 inches or smaller at the apex.

Another form of the present invention is a double pyramid or octahedral optical element. The element can be made of ruby, emerald, liquid dye, neodymium-doped glass, gas or other laser materials. In one embodiment the octahedron has a window to provide means for extraction of energy from the system when used in a laser apparatus.

SPECIFIC EXAMPLES OF INVENTION

Referring now to the drawings, FIGS. 1–4 illustrate an optical pyramid having a square base 11 with equilateral triangular side panels 12, 13, 14 and 15.

Figure 5:
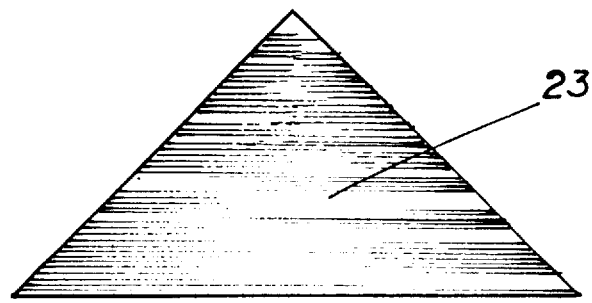
FIG. 5 is a side view of another embodiment of this invention, wherein the side panel is a right triangle with acute angles of 45°, with the right angles meeting at the apex.
Figure 6:
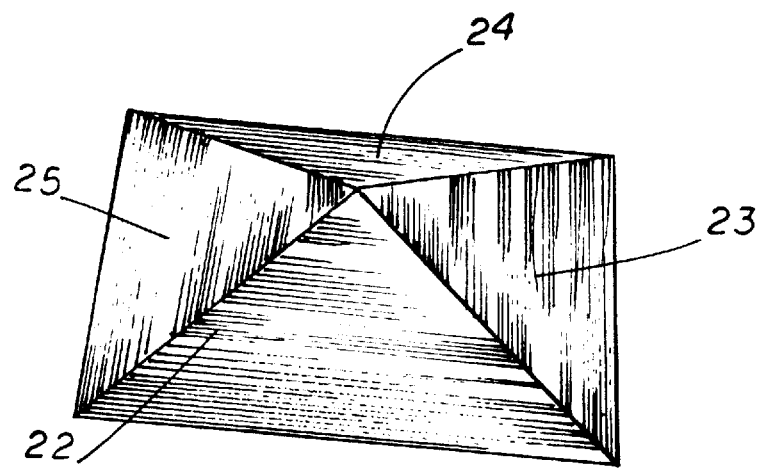
FIG. 6 is a perspective top view of the embodiment of FIG. 5.

The right angle face embodiment illustrated in FIGS. 5 and 6, has a rectangular base 21 and four triangle side faces of equal size and shape 22, 23, 24 and 25 which are triangles meeting at the apex and having 45° acute angles. A glass pyramid was constructed and tested in accordance with the embodiment of FIGS. 5 and 6, having a square base 1" on each side, a height of about ½", with the sides of the right triangular faces being approximately ⅞".

Figure 7:
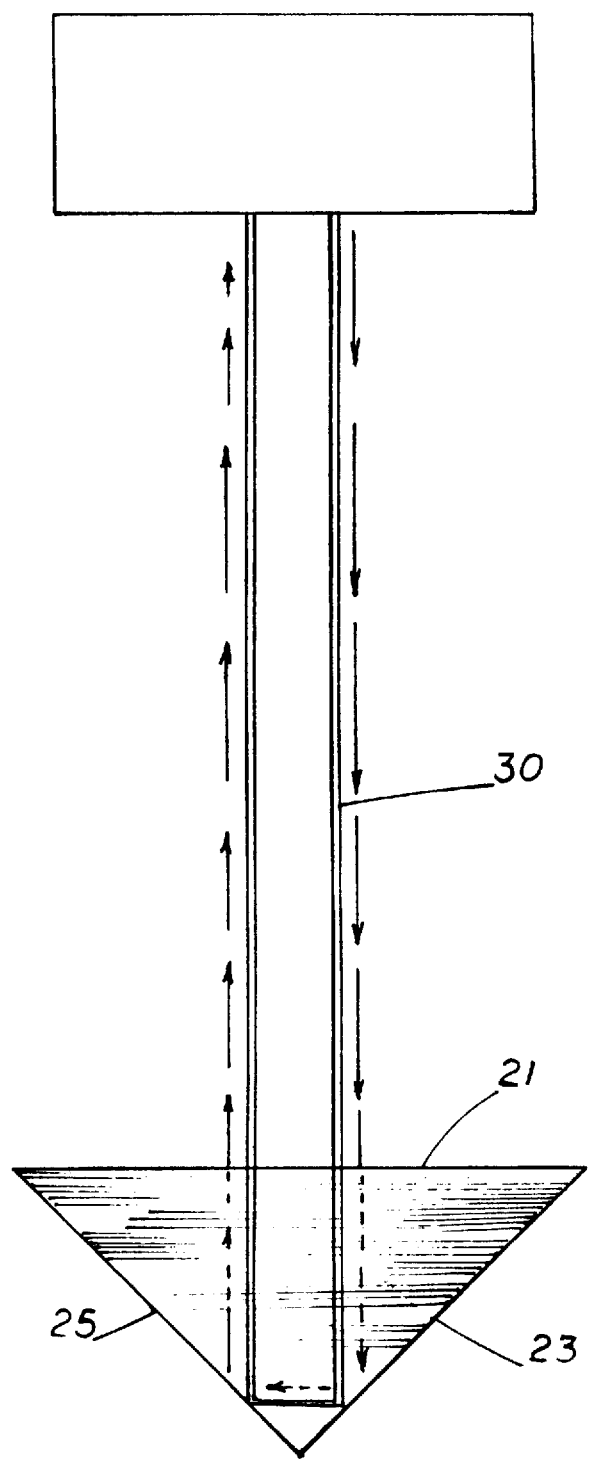
FIG. 7 is a diagrammatical view showing a beam from a laser source perpendicular to the base of the embodiment of FIG. 5, being reflected back so that there is 0° reflection.

The high power laser reflector illustrated in FIG. 7 shows a laser beam of approximately ¼" in width entering from the base of the pyramid and being reflected directly backwards as beam 31.

Figure 8:
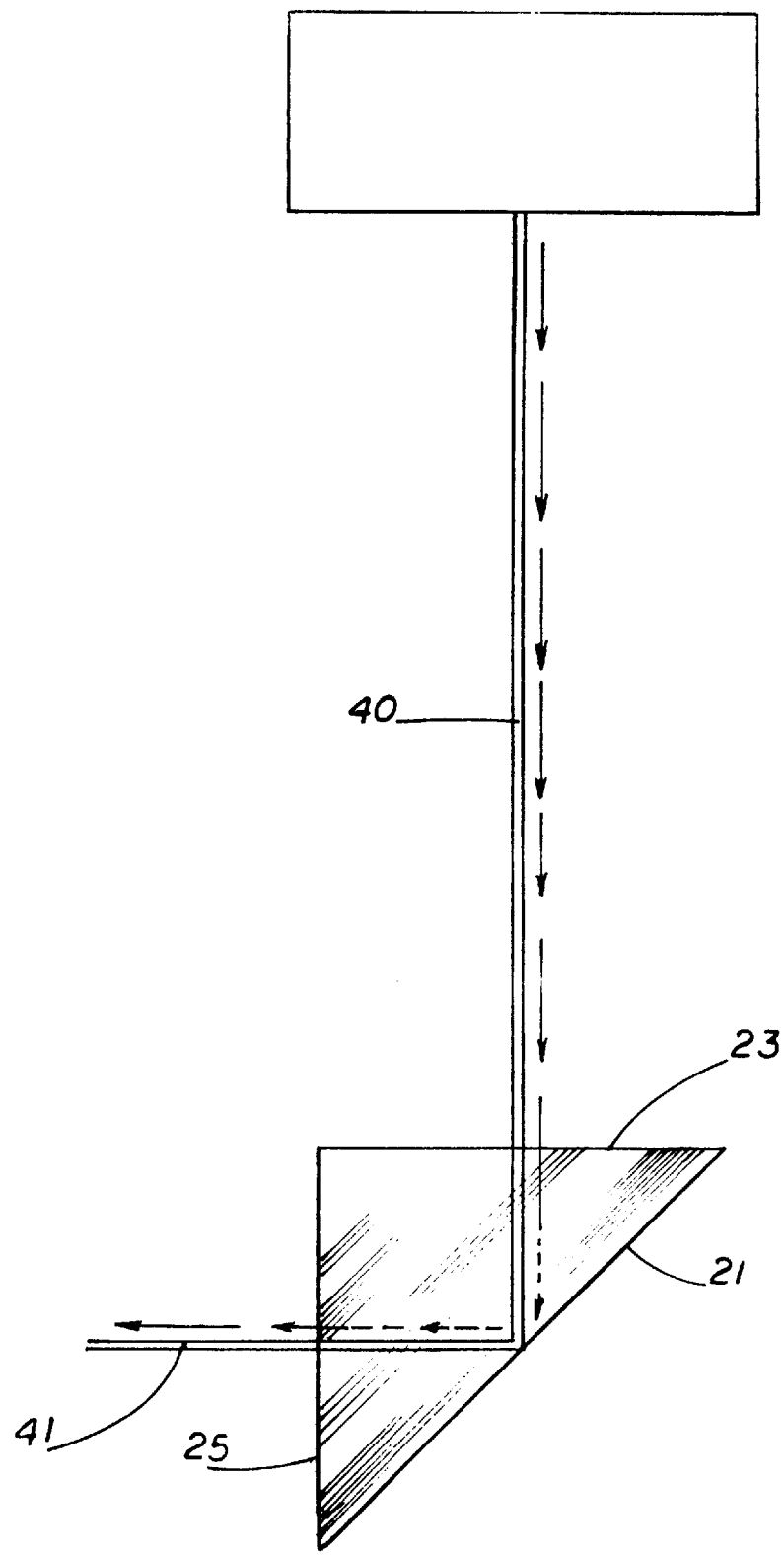
FIG. 8 illustrates diagrammatically a high power laser beam directed perpendicular to the center of one of the faces of the embodiment of FIG. 5, which provides a 90° reflection so that the beam exits through another face. (It should be noted that there is no coating material).

In the high power right angle reflector, illustrated in FIG. 8, laser beam 40 enters perpendicularly to the face of the pyramid, goes through to the base and is reflected out at 90° as beam 41.

Figure 9:
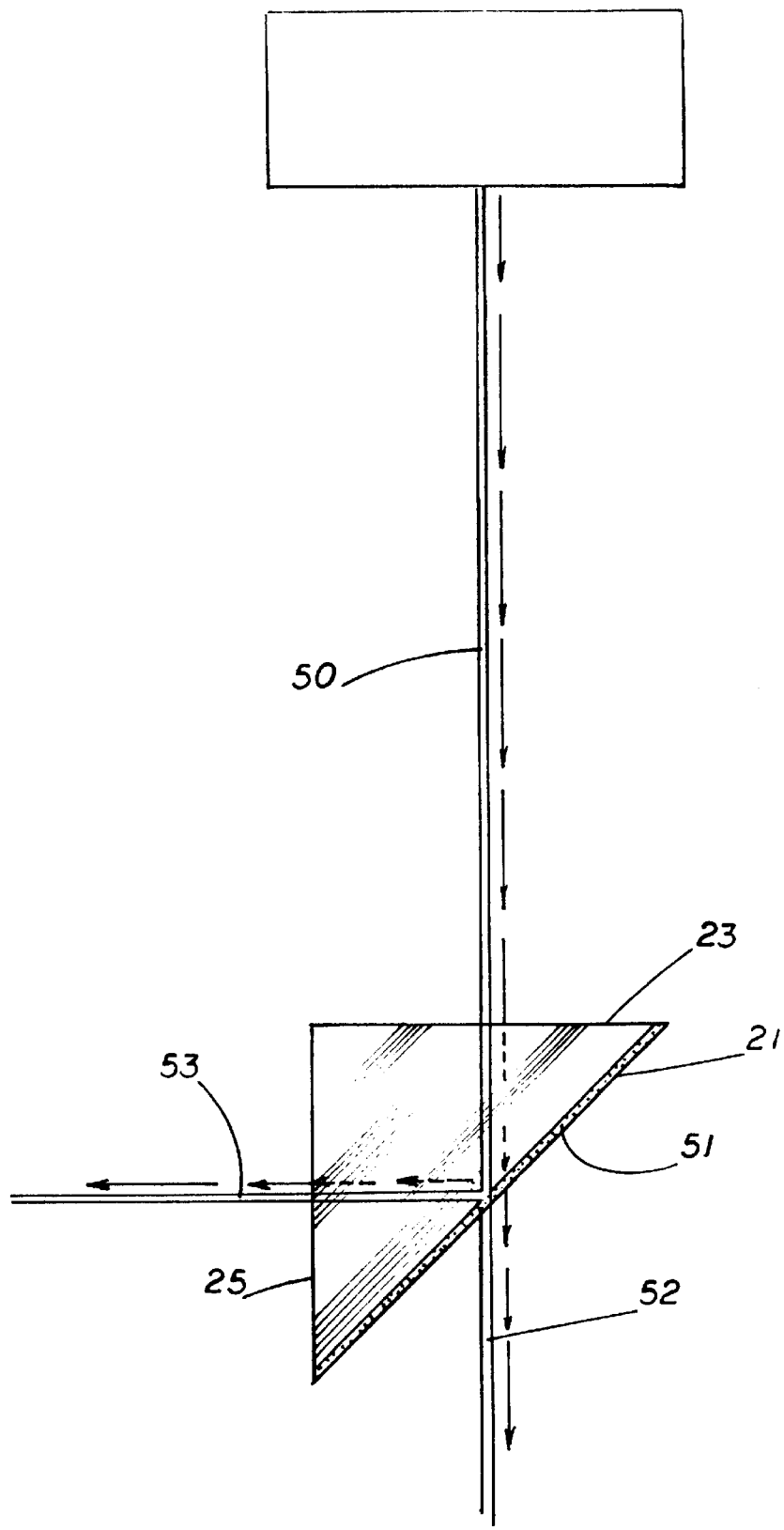
FIG. 9 shows a laser beam perpendicular to one of the faces of the pyramid of FIG. 5 with a coating on the base resulting in a splitting of the beam.

The beam splitter illustrated in FIG. 9 shows a laser beam 50 entering one face of the pyramid and then impinging on the coating 51 of the base so as to split into two exit beams 52 and 53.

Figure 10:
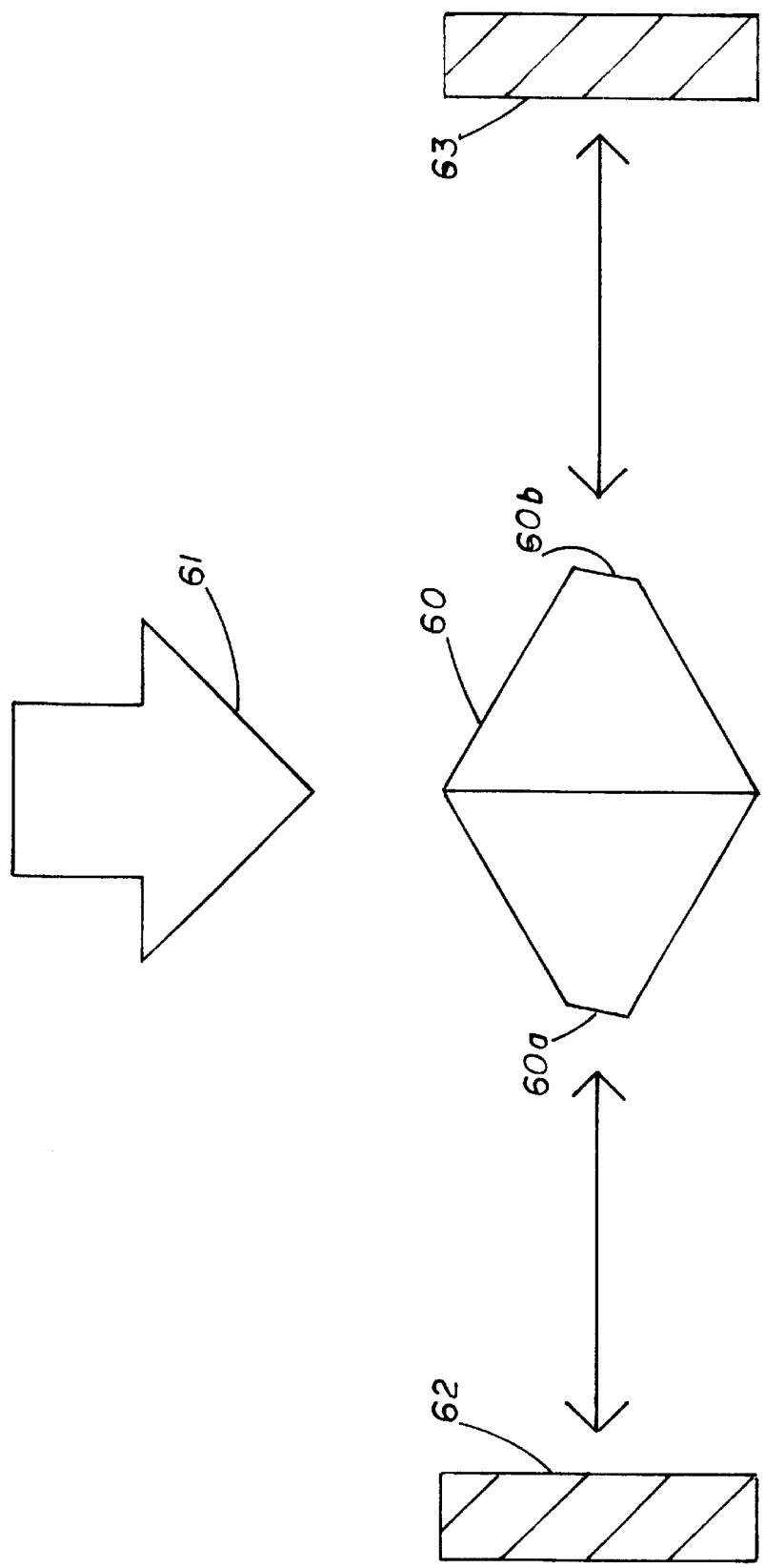
FIG. 10 is a diagrammatic view of a geometric laser resonator in the form of an octahedron having windows for extraction of energy.

The octahedron 60 made of laser material and illustrated in FIG. 10 is irradiated with an optical pump. It has cuts 60a and 60b which act as energy-extraction windows. The high reflector 62 provides circulatory laser radiation. The partial reflector 63 permits laser output.

One advantage of the present invention is greater efficiency per volume. The present invention is easier to make and handles greater power than previous optical elements. It has greater angular acceptance.

We claim:

1. A laser apparatus comprising a solid regular pyramid made of laser material, having a square base and four triangular faces of equal size and shape meeting at the apex and a laser beam directed perpendicularly to said base and characterized as having substantially 0° reflection.

2. A laser apparatus comprising a laser source whose beam is directed perpendicularly to one face of a solid regular pyramid made of optical material, having a square base and four triangular faces of equal size and shape meeting at the apex, said beam being reflected on the base to provide an exit beam through an opposite face.

3. The laser apparatus of claim 2 wherein the optical material is glass.

4. The laser apparatus of claim 3 wherein the glass is selected from the group consisting of BK-7 glass, fused quartz and sapphire.

5. A laser apparatus comprising a laser source whose beam is directed at one face of a solid regular pyramid made of optical material, having a square base and four triangular faces of equal size and shape meeting at the apex, said base having a reflective coating so that the beam upon striking the coating is split to provide an exit beam through the base in the same direction and also a reflective beam from an opposite face.

6. The laser apparatus of claim 5 wherein the optical material is glass.

7. The laser apparatus of claim 6 wherein the glass is selected from the group consisting of BK-7 glass, fused quartz and sapphire.

8. An octahedron made of a solid laser material and shaped in the form of two identical regular pyramids attached on their bases, each pyramid having a square base and four triangular faces of equal size and shape meeting at the apex.

9. The octahedron of claim 8 wherein a window is provided at an apex for extraction of energy.

* * * * *